US006324743B1

(12) United States Patent
Gonnet et al.

(10) Patent No.: US 6,324,743 B1
(45) Date of Patent: Dec. 4, 2001

(54) METHOD FOR SETTING A PIECE FASTENING BASE PLATE

(75) Inventors: Louis Gonnet, Saint Jean de Muzols; Guy Jaillet, La Roche de Glun, both of (FR)

(73) Assignee: Societe de Prospection et d'Inventions Techniques Spit, Bourg les Valence (FR)

( * ) Notice: Subject to any disclaimer, the term of this patent is extended or adjusted under 35 U.S.C. 154(b) by 0 days.

(21) Appl. No.: 09/449,488

(22) Filed: Nov. 29, 1999

(30) Foreign Application Priority Data

Nov. 30, 1998 (FR) .................................................. 98 15026

(51) Int. Cl.[7] ...................................................... B23P 11/02

(52) U.S. Cl. ................................ 29/453; 29/428; 227/10; 227/119; 403/230; 403/294

(58) Field of Search ............................ 29/453, 235, 428; 227/10, 119; 403/230, 240, 294, 353; 248/49, 68.1

(56) References Cited

U.S. PATENT DOCUMENTS

| | | | | |
|---|---|---|---|---|
| 2,657,894 | * | 11/1953 | Sklenar | 248/239 |
| 2,677,863 | * | 5/1954 | John | 24/127 |
| 2,948,937 | * | 8/1960 | Rapata | 24/297 |
| 3,091,795 | * | 6/1963 | Budwig | 16/2.1 |
| 3,339,861 | * | 9/1967 | Montesi | 242/118.7 |
| 3,776,443 | * | 12/1973 | Oefinger | 227/10 |
| 3,816,883 | * | 6/1974 | Dzus, Sr. et al. | 411/349 |
| 3,897,162 | * | 7/1975 | Havark | 403/353 |
| 3,998,372 | | 12/1976 | Leonardo et al. . | |
| 4,214,723 | * | 7/1980 | Voorhees, Jr. | 248/68.1 |
| 4,434,927 | * | 3/1984 | Butler et al. | 227/9 |
| 4,467,988 | * | 8/1984 | Kraus | 248/68.1 |
| 4,565,312 | * | 1/1986 | Berry | 227/8 |
| 4,684,050 | * | 8/1987 | Masas | 227/10 |
| 4,703,883 | * | 11/1987 | Losada | 227/9 |
| 5,722,578 | * | 3/1998 | Van Erden et al. | 227/8 |

FOREIGN PATENT DOCUMENTS

| | | |
|---|---|---|
| 0 721 032 | 7/1996 | (EP) . |
| 2 703 288 | 10/1994 | (FR) . |
| 98/47668 | 10/1998 | (WO) . |

* cited by examiner

*Primary Examiner*—S. Thomas Hughes
*Assistant Examiner*—Essama Omgba
(74) *Attorney, Agent, or Firm*—Lowe Hauptman Gilman & Berner, LLP

(57) ABSTRACT

By means of the fastener fixing tool fitted with a fastener-guide (30), the base plate and the end (23) of the fastener-guide (30) are firmly fixed together, by a relative movement of the base plate and the end (23) of the fastener-guide (30), the one in relation to the other, in a plane perpendicular to the axis (21) of the fastener-guide (30), the base plate is pressed against a receiver-support (100) and attached there by means of a fastener. Where the base plate constitutes a female part for firmly uniting with the end (23) of the fastener-guide (30), the fastener-guide (30) is provided with an exterior annular groove (24) to receive a snap fit clamp (11) of the base plate.

4 Claims, 1 Drawing Sheet

METHOD FOR SETTING A PIECE FASTENING BASE PLATE

BACKGROUND OF THE INVENTION

In the building industry, base plates are often used for fixing cables, pipes, ducts and other pieces of this type to a support.

A base plate for attaching a cable comprises, for example, a means of supporting the cable and means of attaching the plate to the support.

To attach the base plate to the support, a nailing device which is fitted with a fastener-guide is generally used, the end of which is joined with the base plate, for instance by driving the end of the fastener-guide into a cutout made to receive it in the base plate.

For safety reasons, the nailing device has a safety system which prevents fastener firing without first pressing the nailing device against a fixing support.

There is however a risk of unlocking the safety system while uniting a base plate and the end of the nailing device's fastener guide, through axial pressure (that is, in the direction of the fastener-guide axis) of the end of the fastener-guide against the base plate. Under these conditions, the nailing device may be pulled into support and firing position without being pressed against a support.

SUMMARY OF THE INVENTION

The invention aims to overcome the problem described above.

The invention concerns a method for setting a base plate for fastening a piece to a support, with the aid of a fastener fixing tool fitted with a fastener-guide, during which the base plate and the end of the fastener-guide are firmly fixed together, the base plate is placed against the support and it is fixed there by means of a fastener, the method being characterised by the fact that the base plate and the end of the fastener-guide are firmly united through relative movement of the base plate and the end of the fastener-guide, the one in relation to the other, in a plane perpendicular to the fastener-guide axis.

This means that, in order to unite the base plate and the end of the fastener-guide, axial pressure force is no longer exerted, but rather radial force, such that the risk of unlocking the safety system is avoided. In addition, as a result of this invention, it is possible to reduce the minimum effort required to move the fixing tool into a supported position. Operator fatigue is reduced this way, for example by setting a base plate against a ceiling with one hand.

The relative movement of the base plate and the end of the fastener-guide may be a translatory motion, preferably a rectilinear translatory motion.

It is advantageous to be able to attach firmly to the end of the fastener-guide and the base plate by a snap fit.

The invention also concerns a tool for carrying out the method defined above, comprising a fastener-guide adapted to be firmly fixed to the base plate, characterised by the fact that, with the base plate being a male part for firm attachment to the end of the fastener-guide, the fastener-guide has a lateral and axial slot for the passage of the base plate.

The invention further concerns a tool for carrying out the method comprising a fastener-guide adapted to be firmly fixed to the base plate, characterised by the fact that, with the base plate being a female part for firm attachment to the end of the fastener-guide, the fastener-guide is fitted with means for locking onto the base plate.

The means for locking onto the base plate comprise an exterior annular groove to receive a clamp for snap fitting onto the base plate.

BRIEF DESCRIPTION OF THE DRAWINGS

The invention will be better understood with the aid of the following description of the plate and of the fixing tool of the invention, in a particular form of implementation, and also in a particular embodiment of the method of setting the base plate, with reference to the appended drawing in which.

DETAILED DESCRIPTION OF THE INVENTION

Figure 1:
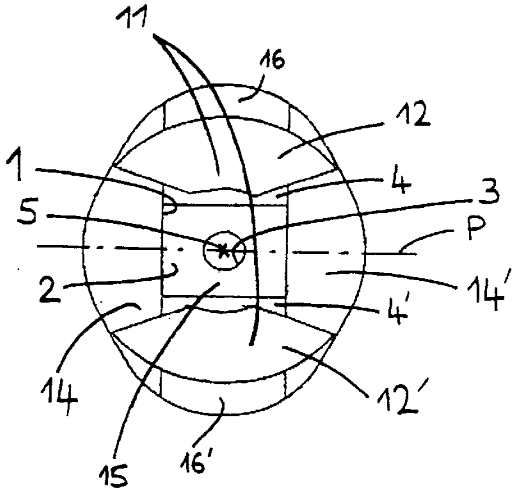
FIG. 1 represents an overhead view of the base plate, in accordance with the particular form of implementation.
Figure 2:
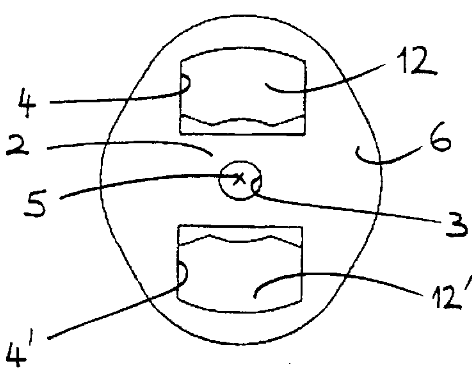
FIG. 2 shows a view from below of the base plate in FIG. 1.
Figure 3:
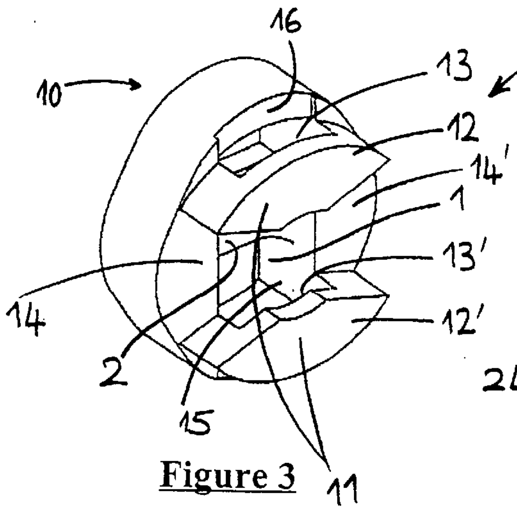
FIG. 3 shows a perspective of the base plate in FIG. 1.
Figure 4:
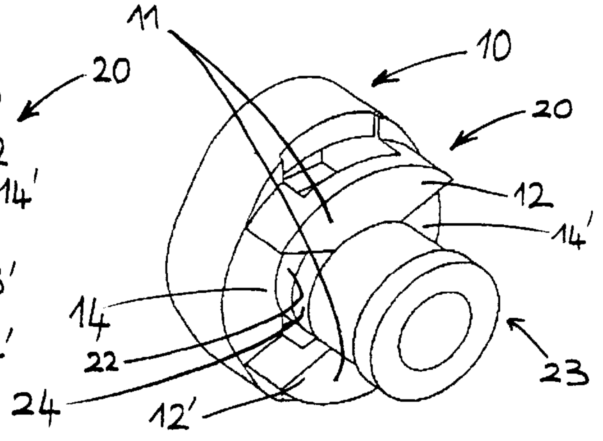
FIG. 4 shows another perspective of the base plate in FIG. 1 assembled onto one end of a fastener-guide and FIG. 5 shows a cross section of the base plate and of the end of the fastener-guide in FIG. 4.
Figure 5:
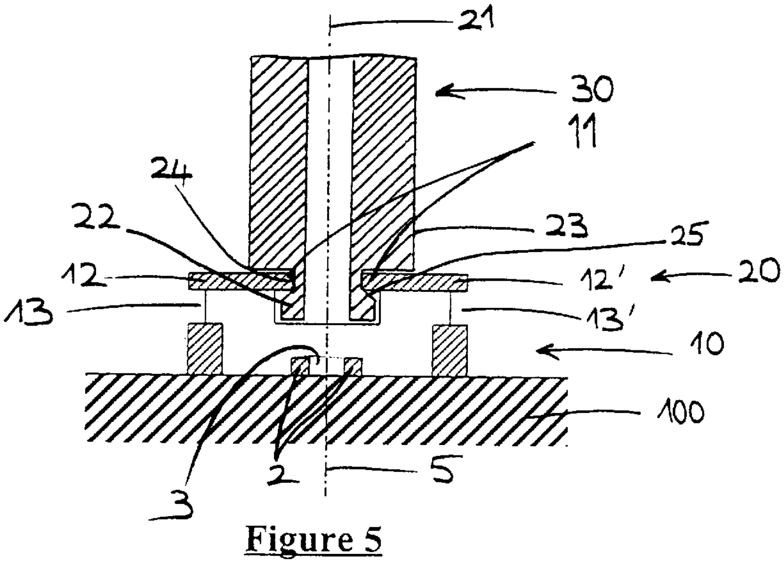

The base plate, intended here to fix a cable to a support, is formed as a single piece and has an axis 5 and an axial plane of symmetry P, containing the axis 5, both at right angles to the plane of FIGS. 1 and 2.

The base plate has a lower section 10, a base, for fixing to the support and an upper section 20 for firm attachment to one end of a fastener-guide of a fastener fixing tool. The lower section 10 and the upper section 20 are connected to each other by mating surfaces perpendicular to the axis 5.

The lower section 10, in the overall form of a flat cylinder with axis 5, comprises, on the lower side opposite the upper section 20, a surface 6 for pressing against the support, perpendicular to the axis 5, and has formed in it, on the upper face, a cut-out 1, approximately parallelepipedic in form, with a base 2. A central hole 3, centered about the axis 5, and running through, to accept a fastener, is formed in the base 2, together with two openings 4, 4', respectively on either side of the plane P.

The upper section 20 comprises two parts 12 and 12', each in the shape of a section of ring, placed facing each other, on either side of the plane of symmetry P, and thus forming a snap fit clamp 11, for seizing the end of the fastener-guide of the fixing tool. The two parts 12 and 12' of the clamp 11 produce between them a space 15 to receive the end of the fastener-guide, extending laterally and axially on both sides of the axis 5, via two lateral and axial openings 14 and 14' respectively for the passage of the end of the fastener-guide.

The terms "axial" and "axially" are here intended to describe what extends in an axial plane, in this case for the base plate the plane P containing the axis 5.

Each part 12, 12' of the clamp 11 is, in its lower section where it has a junction with the lower part 10, traversed by an aperture 13, 13' connecting with the cut-out 1 and provided for the passage of a cord for holding the cable to be fixed, and to receive the end of the fastener-guide, as will be explained later.

The section of the lower part 10, situated approximately in the lower extension of each of the parts 12 (12') of the clamp 11, extends slightly outwards beyond the clamp 11, and presents an upper receiving surface 16 (16'), on the clamp 11 side, to support a cord for holding the cable to be fixed.

The fastener fixing tool of the invention, for fixing to a support the above described base plate, differs from a classic fixing tool of the type described in the document FR-9514763, only in certain aspects which will now be described. For the purposes of clarity, only the aspects necessary to the understanding of the invention will be explained.

The fixing tool comprises in the classical manner a fastener-guide 30 and a safety system.

The fastener-guide 30, extending along an axis 21, is intended to accept a fastener and, after pressing against a fixing support, to guide this fastener propelled forwards when fired, in such a way that it is driven correctly into the support. In order to fix the previously described base plate to a support, the end 23 of the fastener-guide 30 is adapted so that it can be firmly attached to the base plate, as will subsequently be explained in greater detail.

The safety system is adapted to lock the tool in rest position and to unlock it when it is pressed against a fixing support, the unlocking taking place under the action of an axial pressure force (that is, parallel to the axis 21 ) of the tool against the support. This means that the safety system prevents any firing of a fastener unless the fastener-guide is first pressed against the support.

The end 23 of the fastener-guide 30 has an outer annular groove 24 to receive and lock the clamp 11 of the base plate. The "end" means here the free end part of the fastener-guide, which is by definition situated at the front of the fixing tool.

The front wall 25 of the groove 24, that is, the wall nearest to the edge of the front free end of the fastener-guide 30, is inclined to the axis 21. The groove 24 flares out towards the front end of the fastener-guide 30.

The section 22 of the end of the fastener-guide situated between the front edge of the free end of the fastener-guide 30 and the groove 24, that is, situated in front of the groove 24, has an external diameter smaller than that of the section of the fastener-guide 30 situated behind the groove 24. The larger diameter behind the groove 24 facilitates the firm attachment of the base plate and the end 23 of the fastener-guide 30.

After the structural description of the base plate and of the fastener fixing tool, the method of setting the base plate upon a support 100 will now be described.

In order to place the base plate upon the support 100, the base plate and the end 23 of the fastener-guide 30 of the fixing tool are first firmly attached, then the base plate is fastened to the support 100 by means of a fastener.

Firm Attachment of the Base Plate and the End of the Fastener-guide

In order to fix the base plate and the end of the fastener-guide firmly together, the base plate is assembled onto the end 23 of the fastener-guide 30 moving the base plate and the end 23 of the fastener-guide 30, the one in relation to the other, in a relative, rectilinear translatory motion, in a plane perpendicular to the axis 21 of the fastener-guide 30, and also to the axis 5 of the base plate. During this movement, the end 23 of the fastener-guide 30 is inserted laterally into the clamp 11 of the base plate, that is into the reception space 15, by passing through one of the lateral and axial openings 14, 14', so that the axis 5 of the base plate and the axis 21 of the fastener-guide become one.

During this translatory movement in the plane perpendicular to the axis 21, no axial force, parallel to that axis 21 is exerted. Only a radial force is exerted, that is, a force perpendicular to the axis 21, so that there is no risk of unlocking the safety system of the fixing tool.

The clamp 11, once aligned with the groove 24, seizes and grips the end 23 of the fastener-guide 30, the clamp 11 and the fastener-guide 30 becoming thus solidly fixed together by a snap fit. The annular peripheral section of the front part 22 of the end 23 of the fastener-guide 30 is partially inserted into the apertures 13, 13' of the base plate and the rear wall of the groove 24 rests against the upper surface of parts 12, 12' of the clamp 11. In this position, the groove 24 locks the base plate in, making difficult any relative movement of the base plate and the end 23 of the fastener-guide 30 in relation to each other, in translatory motion parallel to the merged axes 5 and 21.

Note that the base plate is a female part and the end 23 of the fastener-guide 30 is a male part for the firm uniting of the one with the other.

Fixing the Base Plate to the Support

After fixing the base plate to the end 23 of the fastener-guide 30, the base plate is applied against the support 100 along its support surface 6, the fixing tool is pressed against the support 100, exerting an axial pressure force against the support 100, which unlocks the tool via the safety system, then a fastener is fired using the tool. Since the axis 21 of the fastener-guide 30 and the axis 5 of the base plate are one, the fastener is driven into the support 100, through the hole 3, and fastens the base plate to the support 100.

Release

After fixing, the fastener-guide 30 is released by separating it from the support 100. During release, the fixing tool is pulled backwards, in an axial direction (parallel to the axes 21 and 5) opposite to that of the firing, thus withdrawing the end 23 of the fastener-guide 30 from the base plate. We emphasise that the withdrawal of the end 23 from the base plate is facilitated by inclination of the front wall 25 of the groove 24.

Fixing the Cable

Finally, in a known manner, a section of the cable to be fixed is inserted between the two parts 12, 12' of the base plate clamp and into the lateral openings 14, 14', and the cable is fixed to the base plate with the aid of a cord which is inserted into the receiving apertures 13, 13' and which is bound around the cable.

In the description above, the base plate and the end of the fastener-guide constitute a female part and a male part respectively, for the purpose of firmly uniting one with the other.

In another embodiment, not differing substantially from that described above, the base plate constitutes the male part and the end of the fastener-guide constitutes the female part for the purpose of firmly uniting one with the other. The base plate has means for preventing the fastener-guide from moving in a translatory manner parallel to its axis and the end of the fastener-guide has formed in it means for receiving the base plate comprising a lateral and axial slot for passage of the base plate.

It is also possible to envisage firmly uniting the base plate and the end of the fastener-guide by a curvilinear translatory movement or by any other relative movement of the base plate and the end of the fastener-guide, the one in relation to the other, in a plane perpendicular to the axis of the fastener-guide.

What is claimed is:

1. A method for setting a base plate for fastening a piece to a support (100), with the aid of a fastener fixing tool which has a fastener-guide (30), during which the base plate and an end (23) of the fastener-guide (30) are firmly fixed together, the base plate is placed against the support (100) and fixed there by means of a fastener, the method comprising:

firmly attaching the base plate and the end (23) of the fastener-guide (30) by a relative movement of the base plate and the end (23) of the fastener-guide (30), the one in relation to the other, in a plane perpendicular to an axis (21) of the fastener-guide (30).

2. The method in accordance with claim 1, in which the relative movement of the base plate and the end (23) of the fastener-guide (30) is a translatory movement.

3. The method in accordance with claim 2, in which the relative movement of the base plate and the end (23) of the fastener-guide (30) is a rectilinear translatory movement.

4. The method in accordance with claim 1, in which the end (23) of the fastener-guide (30) and the base plate are firmly united by snap fit.

* * * * *